United States Patent [19]

Grone

[11] Patent Number: 4,737,792
[45] Date of Patent: Apr. 12, 1988

[54] COUNTER-BASED SIMULATED TARGET GENERATOR

[75] Inventor: Donald J. Grone, Reisterstown, Md.
[73] Assignee: Westinghouse Electric Corp., Pittsburgh, Pa.
[21] Appl. No.: 876,554
[22] Filed: Jun. 20, 1986
[51] Int. Cl.[4] ............................................... G01S 7/40
[52] U.S. Cl. .................................................... 342/169
[58] Field of Search ................... 342/169, 172; 434/1, 434/2

[56] References Cited
U.S. PATENT DOCUMENTS
4,049,953  9/1977  Evans, Jr. ........................... 342/169
4,334,866  6/1982  Burrows ............................. 342/169

Primary Examiner—T. H. Tubbesing
Assistant Examiner—Mark Hellner
Attorney, Agent, or Firm—R. P. Lenart

[57] ABSTRACT

Apparatus and a method for generating simulated target signals for testing a radar system is disclosed. The fundamental timing intervals for each pulse of the simulated target signal are generated based upon the contents of a high-speed continuously running digital counter. The resolution of the system is determined by the clock rate utilized to increment the counter. Simulated target signals are generated by utilizing an adder to add the desired range to the contents of the counter at a time interval corresponding to each pulse of the radar sync signal. The output signal of the adder corresponds to the expected output of the counter at a time corresponding to the return pulse associated with the transmit sync signal. These values are stored in a digital memory at sequential address locations. The stored values are sequentially read to produce at the output of the memory a digital signal corresponding to the value of the high-speed counter at the time that the return pulse is to be generated. The output data of the memory is compared to the contents of the counter and when they are found to be equal, a pulse of the simulated target signal is generated and the read address to the memory is incremented one count. This process is repeated for each pulse of the transmit sync signal to generate at the output a pulse train with each pulse of the output being delayed from its corresponding pulse of the transmit sync signal by the value determined by the range signal.

3 Claims, 4 Drawing Sheets

COUNTER-BASED SIMULATED TARGET GENERATOR

BACKGROUND OF THE INVENTION

1. Field of the Invention

The invention relates to simulated target signal generators for use in testing radar.

2. Description of the Prior Art

In the prior art, simulated target return signals for testing radars was frequently generated by utilizing a plurality of counters with each counter sequentially incremented to generate the required delay signal for sequential pulses of the radar signal. These prior art simulated target signal generators required that each of the counters be capable of operating at very high frequency rates if high resolution was to be obtained. Additionally, if extremely long ranges were to be simulated, the number of counters could become relatively high in that the first counter in the stack cannot be initialized to generate a second return until a sufficient time interval has elapsed for the previous return to be processed. For extremely long ranges at high resolution, this becomes a rather cumbersome problem.

SUMMARY OF THE INVENTION

The system and method for generating simulated radar target signals in accordance with this invention provide an improved system for generating high resolution simulated target signals. The disclosed system requires a minimum of high-speed logic circuitry in that the only truly high-speed logic circuitry required is a sequential counter having a sufficient number of bits so that the required resolution can be achieved. In practice, all that is required is that the number of bits in the signal specifying the range to a simulated target not exceed more than half the bit width of the high-speed counter.

More specifically, a high speed counter is continuously incremented by a high speed clock signal. Each transmit sync pulse from the radar system to be tested initiates an adder which adds the range to the simulated target to the current value of the counter to generate a number which specifies the value stored in the counter at the termination of a delay period corresponding to the range of the simulated target. This number is stored in a digital memory. The stored value is read and compared to the value stored in the counter. When they are equal a pulse corresponding to a simulated target return is generated. Each pulse of the transmit sync signal is similarly utilized to generate simulated target return signals, so long as the test is in progress. This process permits overflows resulting from the additon to be ignored so long as the previous limitation on the number of bits in the range signal and counter are observed.

DESCRIPTION OF THE PREFERRED EMBODIMENT

Figure 1:
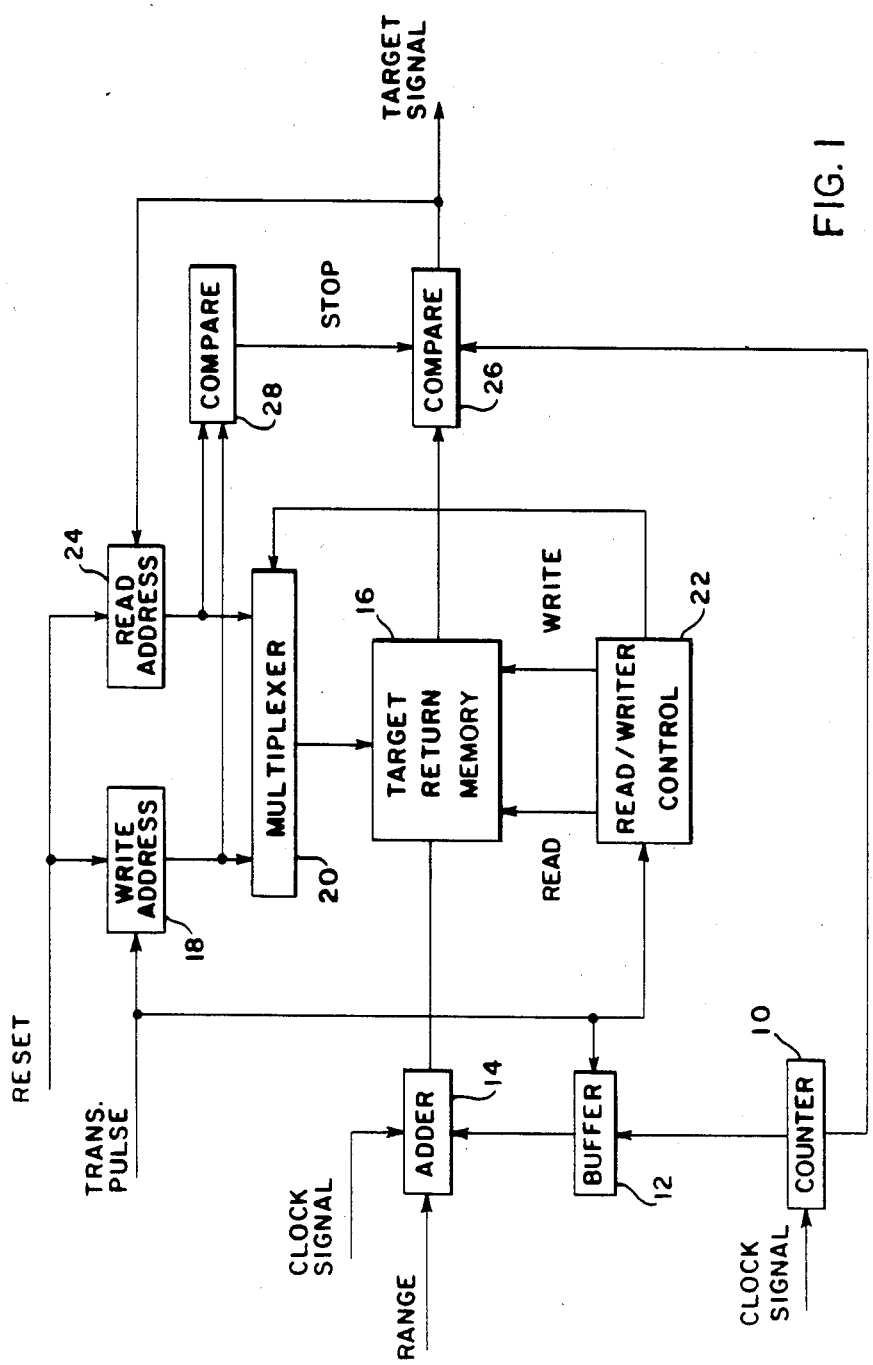
FIG. 1 is a block diagram of the preferred embodiment of the invention.

The preferred embodiment of the invention is functionally illustrated in FIG. 1. The inputs to the simulated target generator comprise a reset signal specifying that the test is to begin, a transmit sync signal including a pulse corresponding in time to each of the transmitted pulses of the radar system for which a simulated target signal is to be generated, a range signal specifying the simulated range for each pulse of the simulated target signal delay and a high-speed clock signal. The high speed clock signal is typically taken from the radar to assure that the circuit is synchronized with the prime equipment.

The delay between each target return and corresponding transmit sync signal is determined by taking a "snap-shot" of the modulo-counter and adding the range word (i.e., the delay). The delay is then produced by waiting until the counter presents a count value equal to the sum calculated by the adder. More specifically, the high-speed clock signal is coupled as an input to a high-speed digital counter 10 to increment this counter one step for each period of the clock signal. The digital output signals of the digital counter 10 are used to define the beginning of and the end of time intervals corresponding to the delay intervals used to generate each pulse of the simulated target signal, as more specifically described subsequently.

The output of the high-speed counter 10 is coupled through a buffer 12 to the first input of an adder circuit 14. Concurrent with each pulse of the transmitted sync signal from the radar, the value of the counter 10 is stored in the buffer 12. A second input to the adder 14 is the range signal corresponding to a pulse of the simulated target signal. Under these conditions, the output of the adder 14 following each pulse of the transmit sync signal will be the expected value of the counter 10 at a point in time when the corresponding pulse of the simulated target signal should be generated. Thus, it can be seen that a series of digital numbers will be sequentially generated at the output of the adder 14 with these values corresponding to the expected value of the counter 10 at the time when the corresponding pulse of a simulated target is to be generated.

A digital memory 16 provides storage for the sequential output numbers generated at the output of the adder 14. Addresses for storing these numbers are provided by a write address counter 18 which is reset to zero by the reset pulse (a pulse indicating that the generation of simulated target signal is to begin) and implemented one count by each pulse of the transmit sync signal. The output signal of the write address counter 18 is coupled as a first input to a multiplexer 20 with the output of the multiplexer 20 coupled to the address bus of the memory 16. Each pulse of the transmit sync signal initiates a store cycle causing the output of the adder 14 to be stored in sequential locations of the memory 16 with storage addresses being provided by the write address counter 18 and the necessary control signals for the memory 16 being provided by a read/write control circuit 22.

The reset signal also forces the value of a read address counter 24 to zero. Address multiplexer 20 receives as a second input the number stored in the read address counter 24. An address select signal to the address multiplexer 20 is provided by the read/write control 22 on a read priority basis. The read cycle takes priority over the write cycle to insure that the count value identifying the position of the next target signal is loaded and stable before the counter realizes that value. Thw write cycle can occur at any time prior to the time required to generate the associated return. That is, when a pulse or the transmit sync signal causes the input to the adder 14 to be updated, the system remains in the read mode until the data stored at the address location specified by the read address counter 24 has been read, and switches to the write mode until this new value has been stored, and then it returns to the read mode to read additional path, as required. This is necessary because failure to read a stored value at the required point in time results in an error in the simulated target signal while no specific time interval is required for the store function so long as the data is stored before it is required to generate a simulated target return.

The data output signal from the data read from the digital memory 16 is coupled as a first input to a multi-bit comparator 26. The second input to this comparator 26 is the contents of the high-speed counter 10. Each time the data output of the memory 16 is found by the comparator 26 to correspond (be identical) to the output of the high-speed counter 10 a pulse of the simulated target signal is generated. This target signal is used to trigger pulse width and RF modulation circuitry necessary for RF target signal generation, and is also utilized to increment the read address counter 24 one count.

The write address from counter 18 and the read address from counter 24 are coupled as inputs to a second multi-bit comparator 28. When these two values are found to be identical, a stop signal is generated which is coupled to the first comparator 26 to inhibit further comparisons and further generation of pulses of the simulated target signal.

From the above discussion, it is clear that the incremental steps of the counter 10 determine the incremental resolution of the pulses of the simulated target signal. Thus, the accuracy of the clock signal and its pulse repetition rate determines the resolution and accuracy of the simulated target signal. Data (each digital value) stored in the memory 16 need not exceed by one the number of bits in the counter 10 so long as the previously discussed limitation on the number of bits used to specify the range of the simulated target is observed. Additionally, no portion of the system other than the counter 10 are required to respond to signals which exceed the pulse repetition rate of the associated radar.

Thus, concerning the current stage of the digital art, it is clear that the only portion of the system requiring high-speed logic is counter 10. In practice, this portion of the system was implemented using emitter coupled logic with the remainder of the system implemented with conventional TTL logic circuitry. Additionally, it is clear that the memory 16 can be implemented using conventional random access memories.

Figure 2:
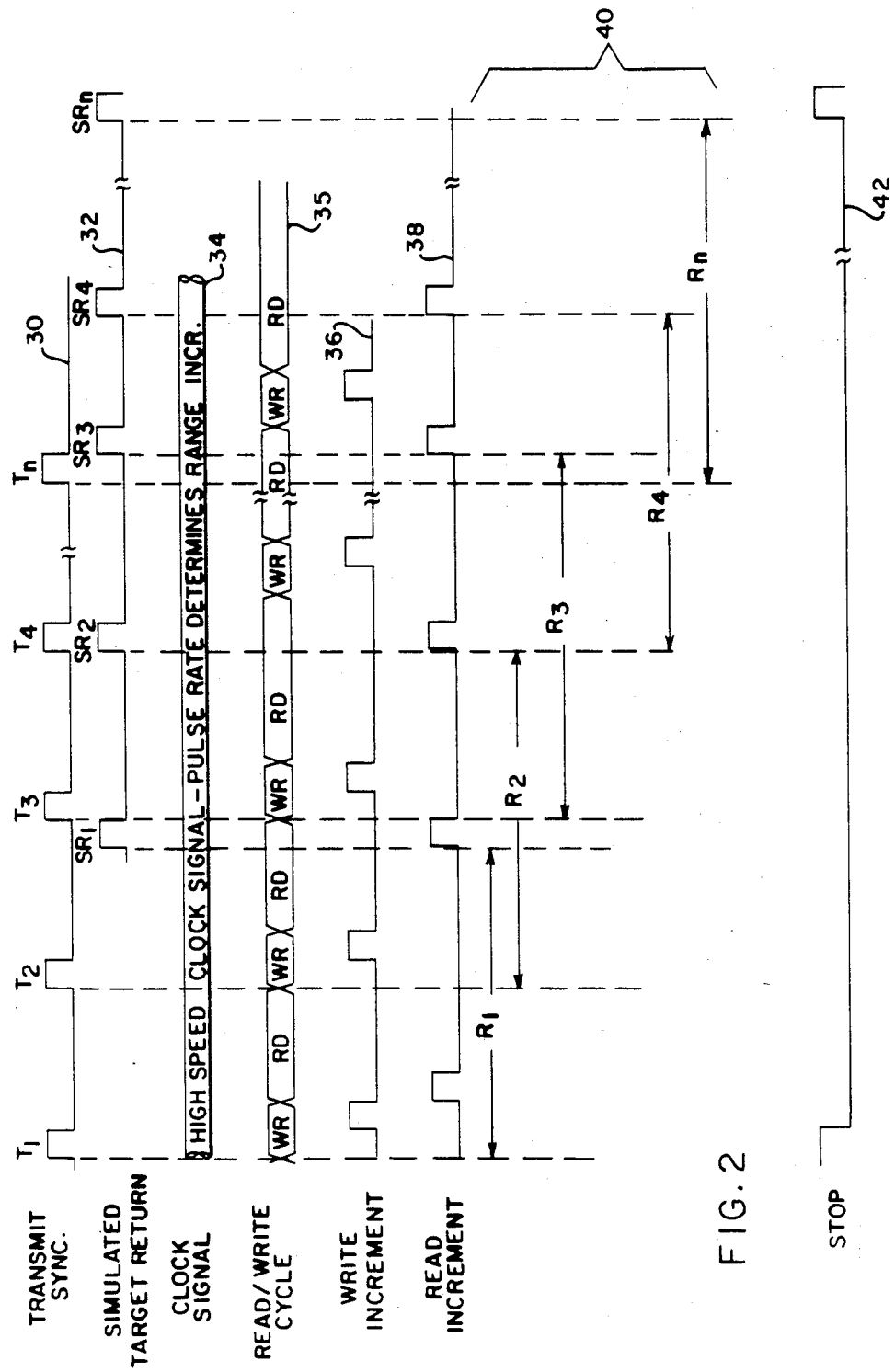
FIG. 2 is a waveform diagram illustrating the operation of the invention.

FIG. 2 is a waveform diagram illustrating the operation of the simulated target signal generator, illustrated in FIG. 1. As is conventional, a transmit synchronizing signal 30 is provided by the radar to be tested with the pulses $T_1$–$T_n$ of a typical signal illustrated in FIG. 2. Each pulse of the transmit sync signal 30 defines the starting time interval for a pulse of the simulated target signal. The pulses $SR_1$–$SR_n$ of the simulated target signal corresponding to the illustrated pulses of the transmit sync signal are illustrated at reference numeral 32 of FIG. 2.

The high-speed clock signal incrementing the counter 10 (FIG. 1) is illustrated at reference numeral 34 in FIG. 2. The pulse repetition rate of this signal, as previously discussed, determines the increments in the simulated target signal. This being the case, it is not practical in FIG. 2 to illustrate the individual pulses of the high-speed clock signal. However, a 100 MHz clock signal results in 5 ft. increments in the simulated target signal. In utilizing the invention, the user simply selects a clock rate which provides the necessary resolution with this clock rate preferably synchronized to the transmit sync signal 30.

As previously discussed for each pulse of the transmit sync signal 30, the read/write control 22 of FIG. 1 generates a pulse of a write signal causing the output of the adder 14 to be stored in memory 16 at an address specified by the write address counter 18. These control pulses from read/write controller 22 correspond to the illustrated pulses of a transmitter sync signal and are illustrated at reference numeral 36 in FIG. 2.

As previously discussed with reference to FIG. 1, each pulse of the simulated target signal increments the read address counter 24 one count. The read pulse signal for incrementing the read address counter 24 is illustrated at reference numeral 38 in FIG. 2. The cycle of read/write is illustrated by reference number 35 in FIG. 2.

A simulated range for each pulse of the transmitter sync signal 30 is specified by the range select signal input to adder 14 at the time the associated pulse of the transmit sync signal occurs. In the example chosen, a different simulated range has been shown for each of the the illustrated pulses of the transmitted sync signal. These intervals are illustrated as $R_1$ through $R_n$ at reference numeral 40 with the range $R_n$ being a typical range which may occur at any point in time subsequent to the other illustrated ranges.

Since only a few pulses of the transmit sync signal 30 are illustrated, the target simulator will automatically stop when these pulses of the simulated target signal have ben generated. As previously described, this occurs when the contents of the read address counter 24 and the write address counter 18 are equal. This will occur at pulse $SR_n$ of the simulated target return signal with the stop initiate being indicated by the high value of this signal as indicated at reference numeral 42.

Figure 3:
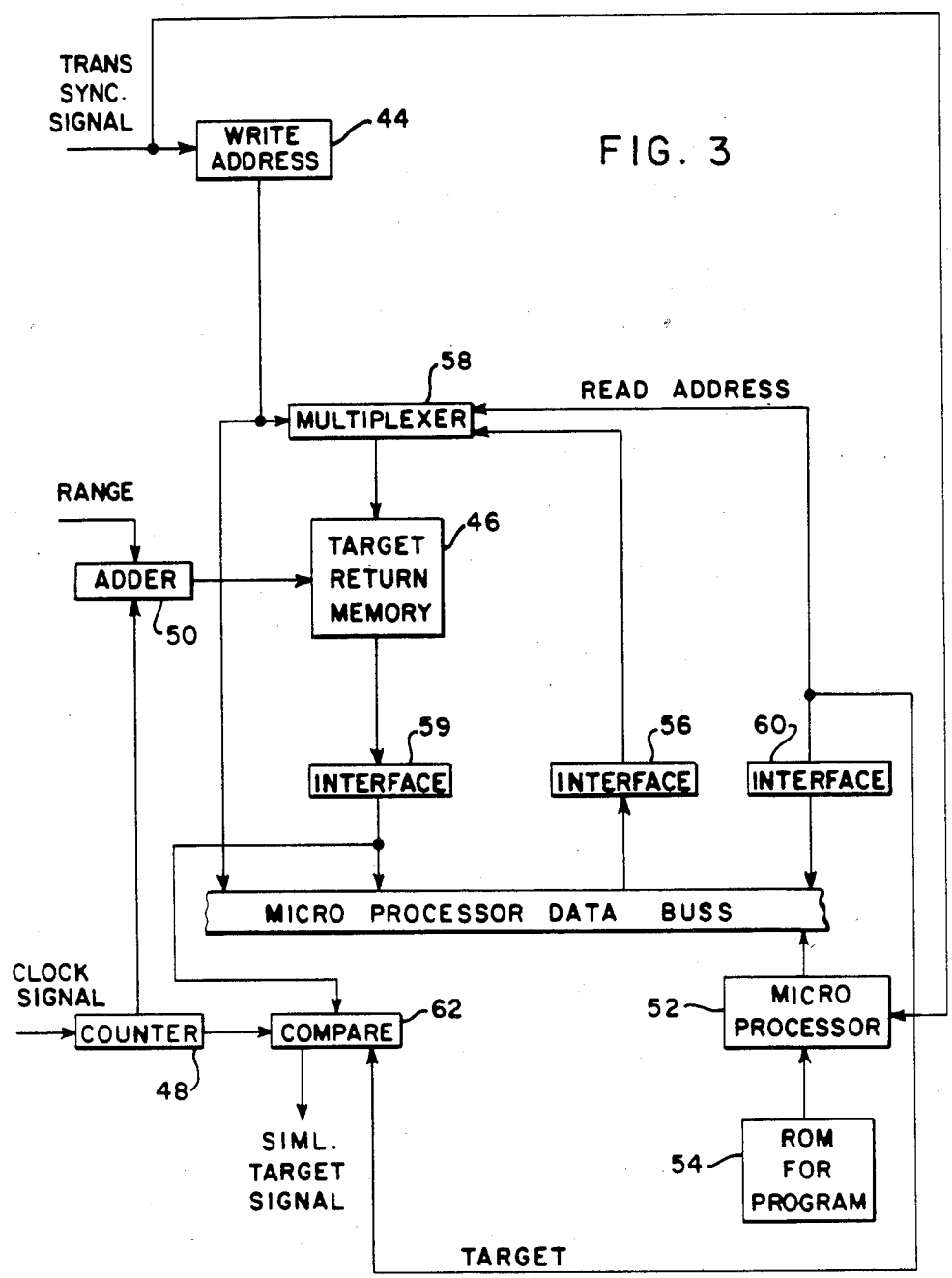
FIG. 3 is an alternate block diagram of the system.

FIG. 3 is an alternate embodiment of the simulated target generator illustrated in FIG. 1 in which portions of the logical operations are performed by a microprocessor. More specifically, the transmit sync signal is coupled as an input to a write address counter 44 to increment this counter to generate write addresses for the memory 46. As with the previous embodiment, the range signal and the output signal of a high-speed counter 48 are coupled to the inputs of a conventional adder circuit 50 to produce at the output of this adder a series of digital numbers specifying the contents of the counter 48 at the time at which a pulse of the simulated target signal is to be generated. The pulses of the transmit sync signal are also coupled as an interrupt to a microprocessor 52. Program storage for the microprocessor 52 is provided by a read only memory 54 which may be programmed in a conventional fashion.

Following each pulse of the transmitted sync signal, the microprocessor 52 generates a write signal which is coupled via the microprocessor data bus and an interface circuit 56 to enable an address multiplexer 58 to couple the write address from the write address counter 44 to the address bus of the memory 46. A signal is also generated causing the output of the adder 50 to be written into the memory 46 at the location specified by the write address counter 44. As with the previous embodiment, this causes a series of digital numbers to be written into the memory 46 with each of these digital numbers corresponding to the value of the counter 48 at the point where a pulse of the simulated target signal should be generated. The read address (the functional counterpart of address counter 24, FIG. 1) is generated by the microprocessor 52 and coupled through an interface circuit 60 to the address multiplexer 58 and to one input of a second comparator 62. The second comparator 62 receives as a second input the contents of the high-speed counter 48. When the contents of the counter 48 and the digitally stored value in memory 46 which is coupled through interface 59 to comparator 62 are equal, the comparator 62 generates a pulse of the simulated target signal. Thus, it can be seen that in this embodiment significant portions of the logic previously indicated as dedicated special purpose hardware in FIG. 1 have been replaced by a programmable microprocessor 52.

Figure 4:
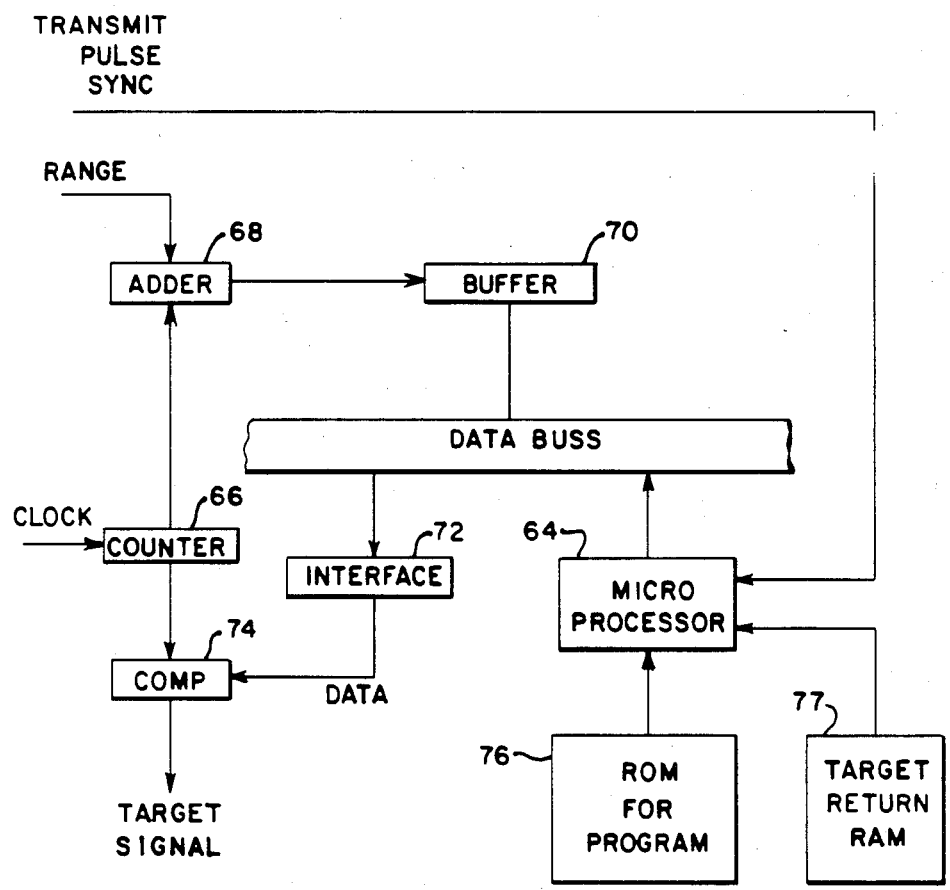
FIG. 4 is a second alternate implementation of the invention.

FIG. 4 is still another embodiment of the invention utilizing a microprocessor. More specifically, the pulses of the transmit sync signal are coupled as an interrupt to a microprocessor 64. As in the other embodiments, the range select signal and the output signal of a high-speed counter 66 are coupled as inputs to a conventional adder 68 to generate at the output of this adder the digital numbers specifying the value of the high-speed counter 66 corresponding to the pulses of the simulated target signal. These numbers are coupled through a conventional buffer 70 to the data bus of the microprocessor 64 and are ultimately stored in the memory of the microprocessor 64. The microprocessor 64 performs all the functions necessary to read these numbers to generate the read address sequences previously discussed. The read addresses are coupled via the microprocessor data bus through an interface 72 to a first input of the comparator 74. The second input to the comparator 74 is the contents of the high-speed counter 66. As in the previous embodiment, each time that the contents of the counter 66 is equal to the data stored a pulse of the simulated return signal is generated. All the other functions previously discussed with reference to FIG. 1 are performed by the microprocessor 64.

As in the previous embodiment, operating programs for the microprocessor are stored in a read only memory 76. Additionally, conventional random access memory can be provided to the microprocessor 64 providing temporary storage for the necessary data processing function. A portion of such a memory dedicated to storing the values of digital counter 66 corresponding to the pulses or the simulated target signal is illustrated at reference numeral 77. This memory and all other parts of the system can be implemented using conventional circuits and techniques.

I claim:

1. A target generator for generating test signals for a radar system comprising:
   (a) a counter circuit having a digital output signal which is continuously incremented by a pulsed clock signal, without being reset;
   (b) an adder circuit receiving as inputs the digital output signal of said counter circuit and a predetermined digital number specifying the range to the simulated target, said adder circuit producing a digital output number in response to an externally generated transmit sync pulse, said digital output number being equal to the sum of the value of said digital output signal when said sync pulse occurs, and the predetermined digital number;
   (c) a random access memory for selectively storing the digital output number of said adder, wherein said adder digital output number corresponds to an expected value of said counter digital output signal when a simulated target return is to be generated; and
   (d) means for reading said adder digital output number from said memory and for comparing said adder digital output number with said digital output signal of said counter to generate a simulated target return when they are equal.

2. A target generator for generating range test signals for testing a radar system, comprising in combination:
   (a) means for generating a digital number which is continuously incremented at a selected rate, without being reset;
   (b) means for combining the value of said digital number existing upon the occurrence of an externally generated transmit sync pulse, with a digital range signal to generate a digital comparison signal, said digital comparison signal being equal to the sum of the value of said digital number when said sync pulse occurs and a predetermined number representative of the range to a simulated target, and corresponding to an expected value of said digital number when a simulated target signal is to be generated;
   (c) memory means for storing at least one value of said digital comparison signal;
   (d) memory read control means for reading said digital comparison signal; and
   (e) compare means for comparing said digital comparison signal to said digital number and for generating a simulated target return signal when they are equal.

3. A method of generating range test signals for testing a radar system, comprising the steps of:
   generating a digital number which is continuously incremented at a selected rate, without being reset;
   receiving an externally generated transmit sync pulse;
   combining the value of said digital number when said sync pulse occurs with a digital range signal to generate a digital comparison signal, said digital comparison signal corresponding to the expected value of said digital number when a simulated target signal is to be generated;
   storing at least one value of said digital comparison signal;
   comparing the stored digital comparison signal with said digital number; and
   generating a simulated target return signal when the stored digital comparison signal and the digital number are equal.

* * * * *